INVENTOR.
George D. O'Neill
BY Arthur B Richardson
His Attorney

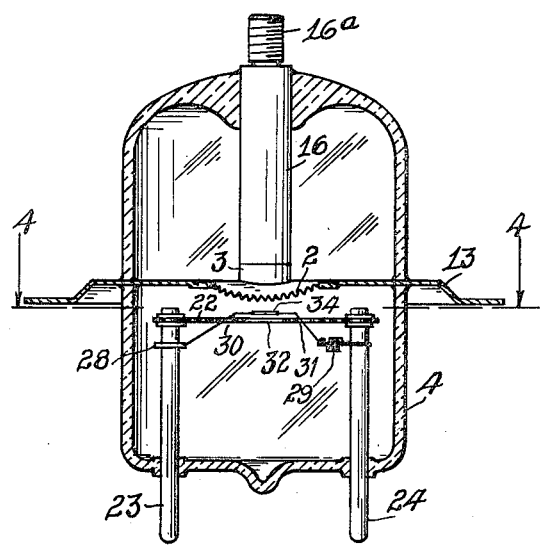
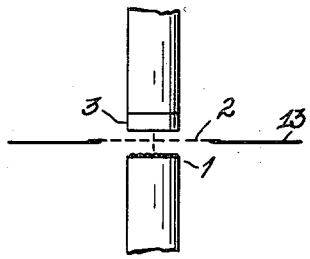
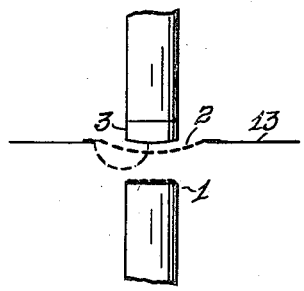
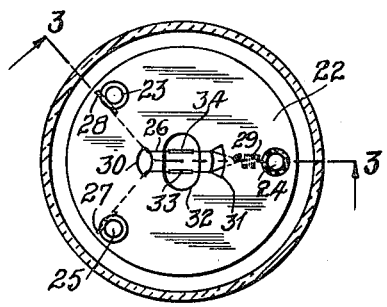
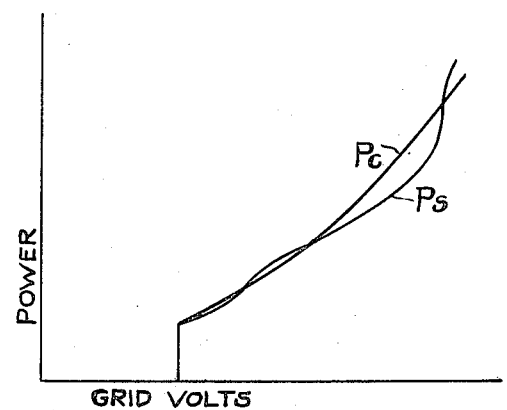

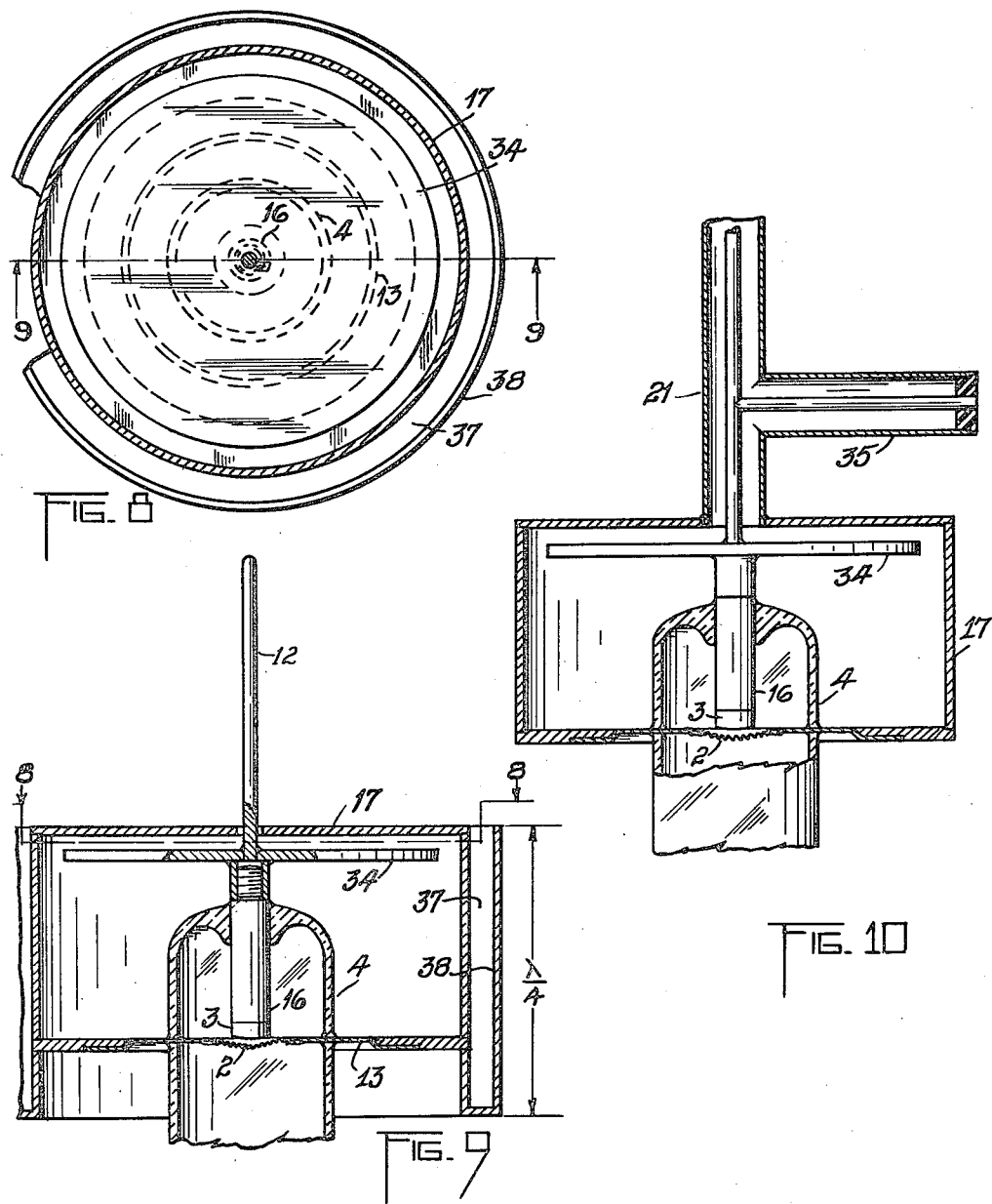

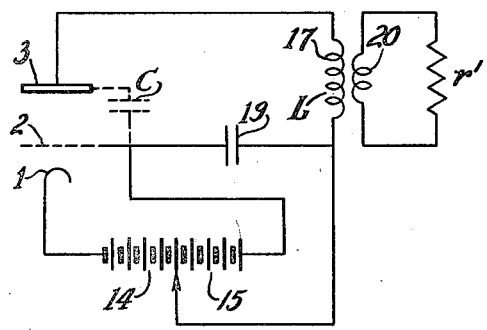
FIG._11
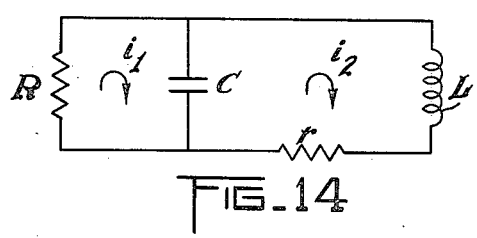
FIG._14
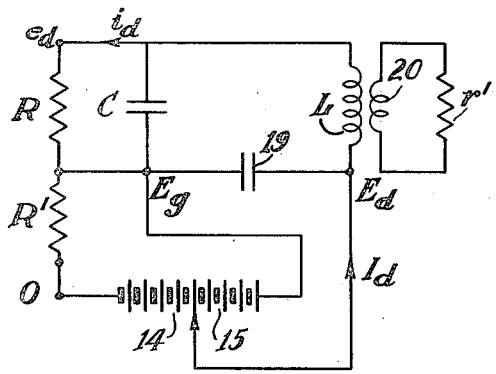
FIG._12
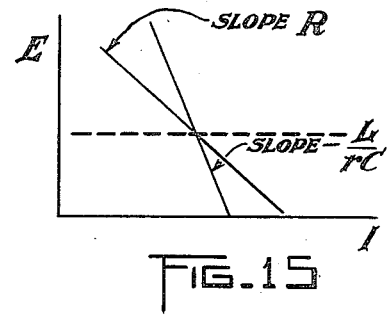
FIG._15
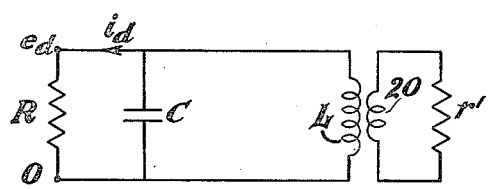
FIG._13
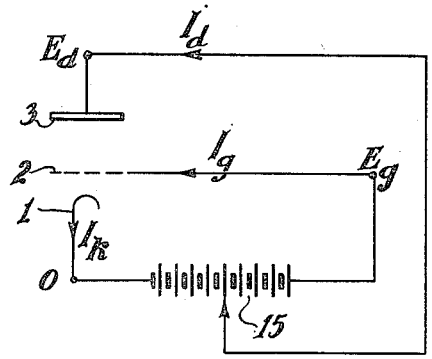
FIG._16
INVENTOR.
George D. O'Neill

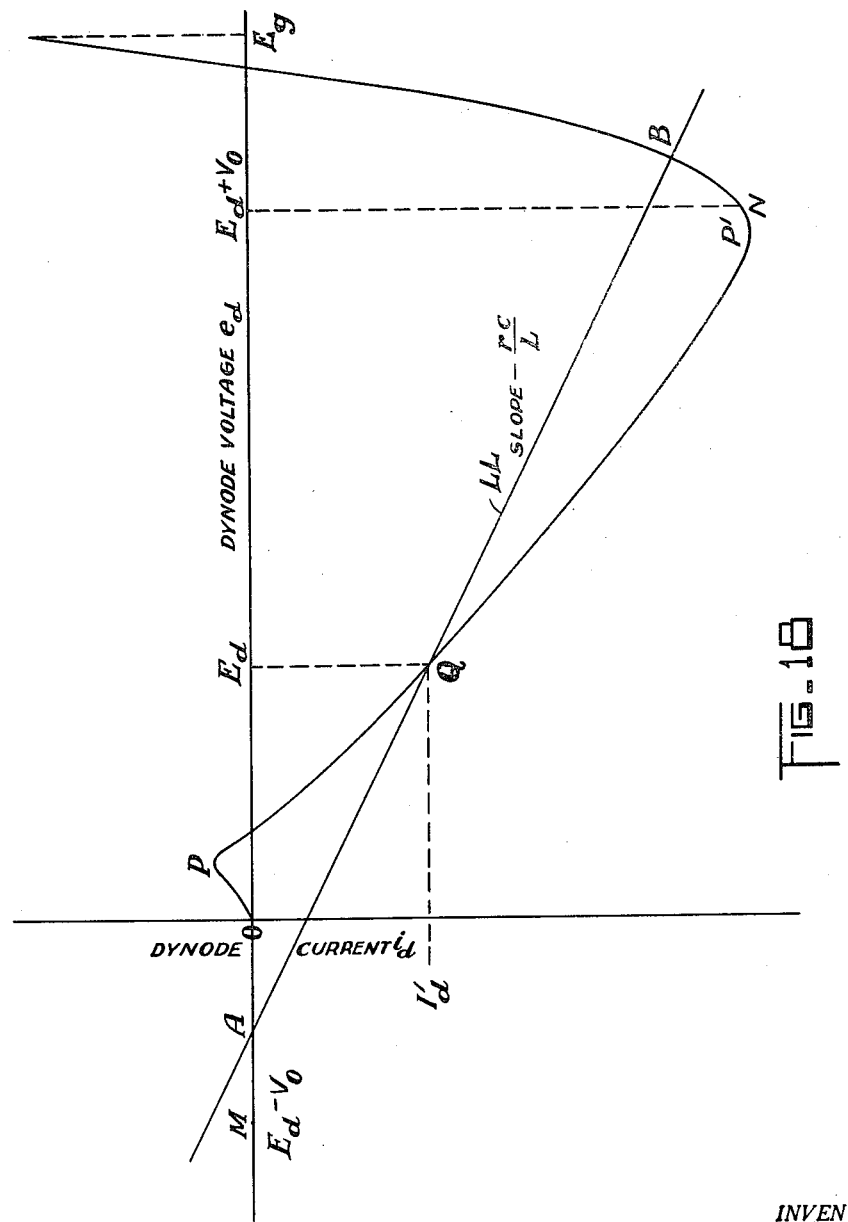

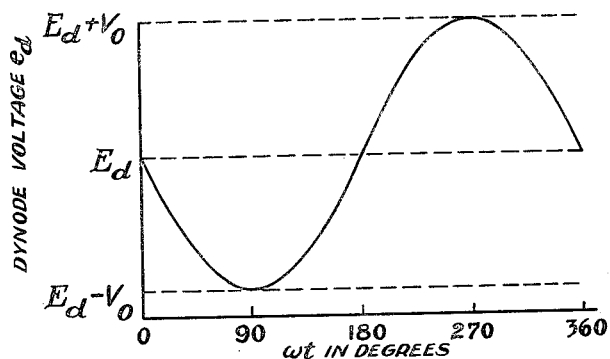
FIG_19
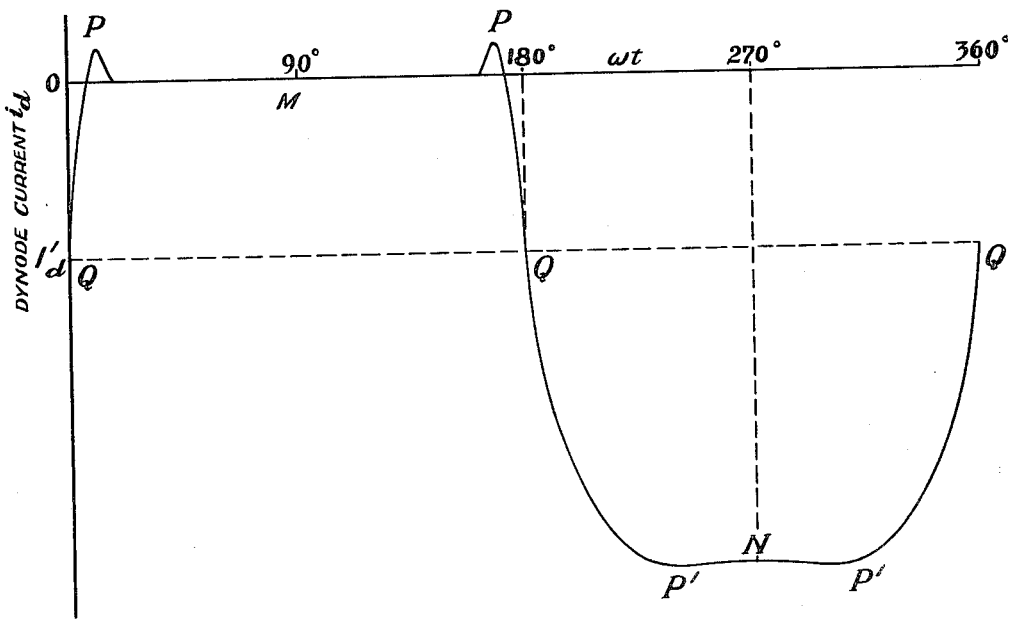
FIG_20
INVENTOR.
George D. O'Neill
His Attorney

INVENTOR.
George D. O'Neill
BY
His Attorney

United States Patent Office 2,707,771
Patented May 3, 1955

2,707,771

ELECTRON DISCHARGE DEVICE OF THE DYNATRON OSCILLATOR TYPE

George D. O'Neill, Port Washington, N. Y., assignor to Sylvania Electric Products, Inc., a corporation of Massachusetts Application July 5, 1946, Serial No. 681,454

43 Claims. (Cl. 332—6)

This invention relates to electron discharge apparatus and devices, and to oscillation generators, detectors, and negative resistance devices.

An object of the invention is to provide novel and improved electron discharge apparatus which has particular application for use at ultra-high frequencies.

Another object of the invention is to provide electron discharge apparatus for simultaneous operation as an oscillator and as a detector, or as a modulated oscillator, at ultra-high frequencies.

Another object of the invention is to provide an oscillator for ultra-high frequencies having a single cavity resonator and to provide an oscillator with improved performance at lower frequencies.

A further object of the invention is to provide a negative resistance oscillator for operation at ultra-high frequencies.

A still further object of the invention is to provide apparatus for utilizing the phenomenon of secondary electron emission to generate oscillations at ultra-high frequencies.

A still further object of the invention is to provide apparatus for utilizing the phenomenon of secondary electron emission in an improved oscillation generator at relatively lower frequencies.

A still further object of the invention is to provide an improved electron discharge device which is simple in construction so as to facilitate manufacture thereof and which is also efficient in operation.

Yet another object of the invention is to provide a novel arrangement of connections to the electrodes in an electron tube.

Figure 1:
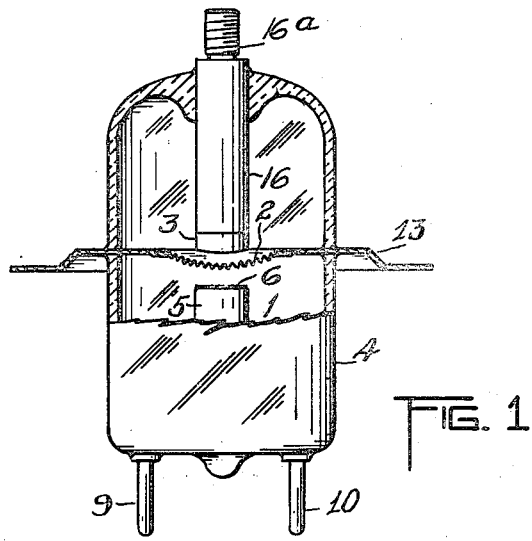
Figure 2:
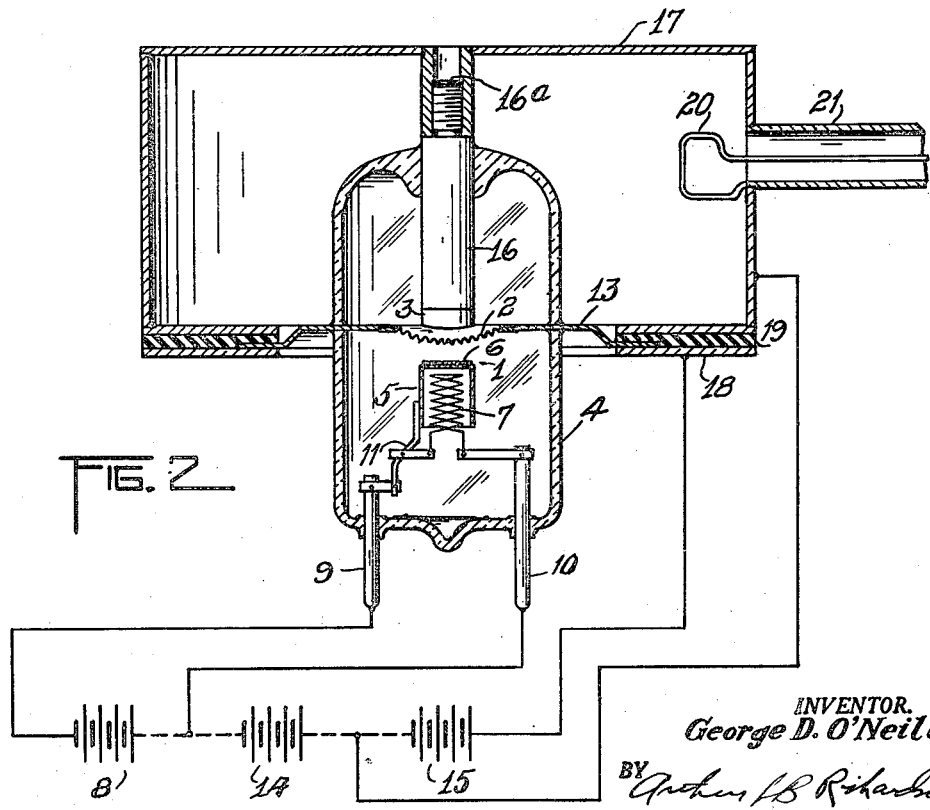
Figure 17:
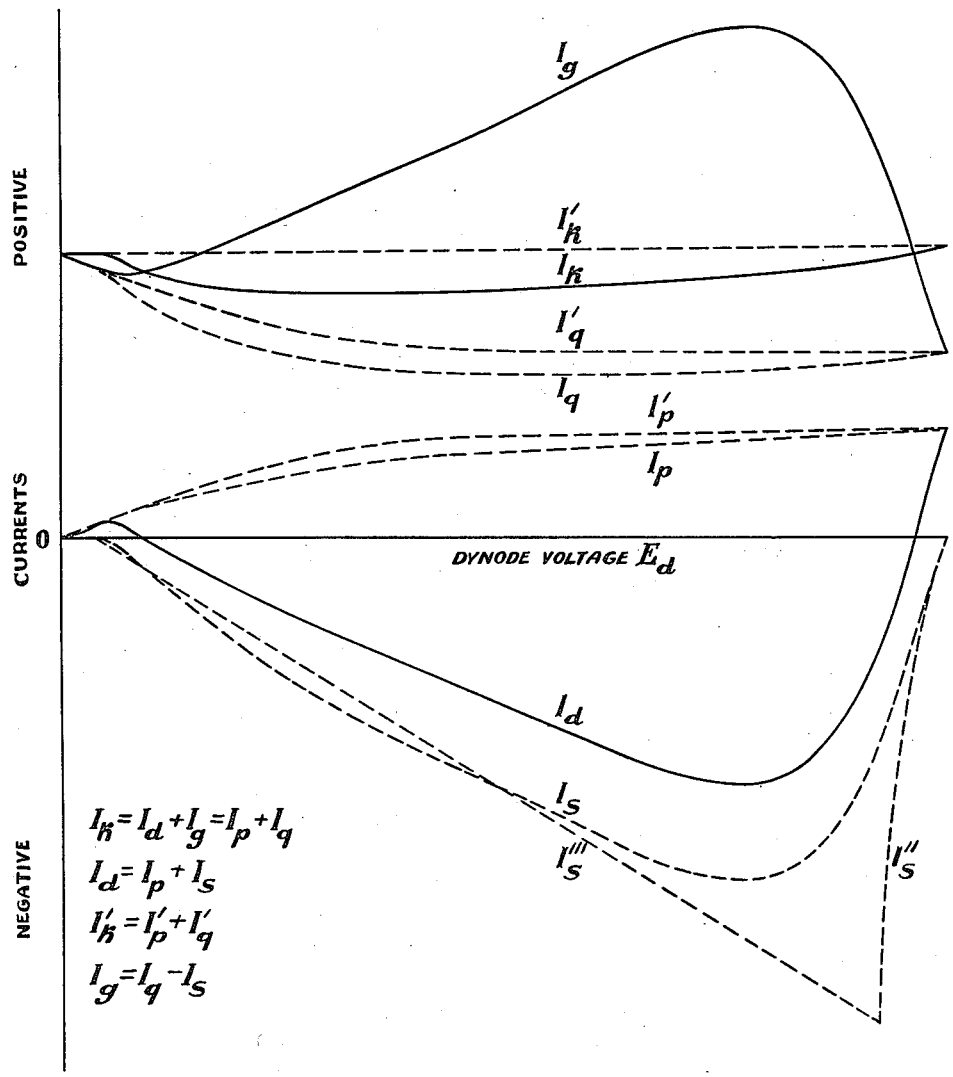
Figure 21:
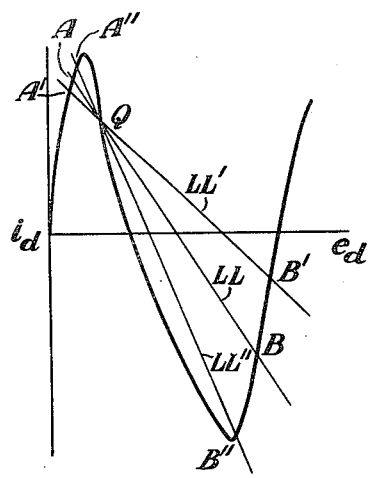
Figure 23:
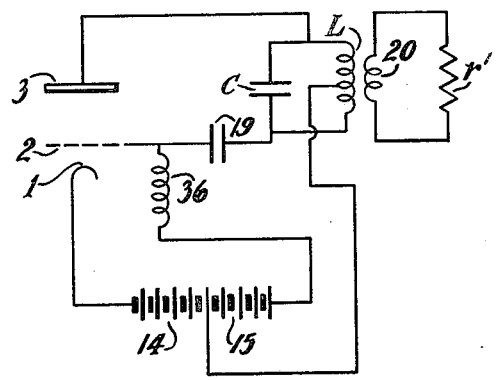
Figure 22:
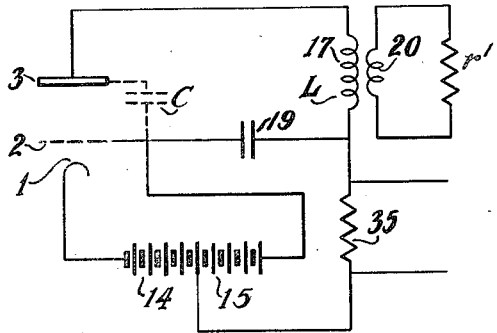
Figure 24:
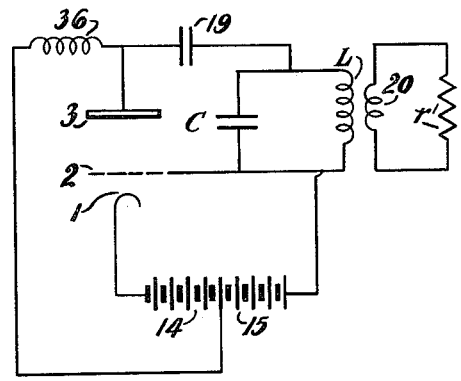

The advantages and novel features of the invention, together with the structure of the embodiments herein described and the modes of operation therof, may best be explained by reference to the drawings, in which Fig. 1 is a side elevation, partly in section, of the evacuated chamber and the electrodes of a preferred embodiment of the device; Fig. 2 is a vertical central section of the device of Fig. 1 conjoined with a cavity resonator and with the electrical connections schematically indicated; Fig. 3 is a sectional view along line 3—3 of Fig. 4 showing the evacuated chamber and electrodes with an improved cathode construction; Fig. 4 is a sectional view along line 4—4 of Fig. 3; Fig. 5 shows the path of electrons returning into the grid-cathode region of a device with flat electrodes; Fig. 6 shows the path of electrons returning into the grid-cathode region of an embodiment of the invention having curved electrode surfaces; Fig. 7 is a chart showing the variations of power output with grid voltage for devices with the electrode structures of Figs. 5 and 6; Fig. 8 is a top sectional view of an embodiment of the device having a novel structure for transferring power to and from the cavity resonator; Fig. 9 is a sectional side elevation of the device of Fig. 8; Fig. 10 is a sectional side elevation of the device of Figs. 8 and 9 connected to a coaxial transmission line; Fig. 11 is a schematic diagram of a circuit electrically equivalent to the device of Fig. 1; Fig. 12 is a modification of Fig. 11 with the electron paths replaced by electrically equivalent resistors; Fig. 13 is a modification of Fig. 12 with the direct current elements removed; Fig. 14 is an electrically equivalent modification of Fig. 13; Fig. 15 is a chart showing the negative resistance voltage-current characteristic curve required between electrodes of a device constructed according to the invention; Fig. 16 is a schematic diagram of a circuit for measuring the characteristics of the device; Fig. 17 is a chart showing the characteristic curves of the device; Fig. 18 is a chart showing a characteristic curve of the device and a line representing the load to which the device is supplying power; Figs. 19 and 20 are charts showing the variation with time of the voltage and current of one electrode of the device; Fig. 21 is a chart showing how the load connected to the device varies when the device operates as a detector; Fig. 22 is a schematic diagram of circuit connections used in applying the invention to use as a detector and as a modulator; Fig. 23 is a diagrammatic representation of one embodiment of the invention for securing improved operation at lower frequencies; and Fig. 24 is a schematic diagram of a second embodiment for securing increased output at lower frequencies.

Referring more particularly to Fig. 1 of the drawings, I have illustrated an electrode assembly enclosed within an evacuated envelope 4. A source of thermionically-emitted electrons is provided by a cathode or first electrode 1 which may be of any suitable type such as metal sleeve 5 which may be coated on the end with a layer 6 of electron emissive material. The cathode 1 is raised to the necessary operating temperature by heater coil 7, shown in Fig. 2, which is supplied with current from battery 8 through pins 9 and 10 sealed through envelope 4. An external connection to the cathode is made by connecting it also to pin 9 through tab 11.

A second electrode or grid 2 is provided and in the illustrated embodiment of the invention this electrode includes in its functions those of electron accelerator to draw the electrons from the cathode and collector to attract electrons leaving electrode 3. The grid may be of any suitable construction such as parallel wires or woven mesh, and is attached to and supported by disc 13 sealed through the evacuated envelope 4 and having its periphery external to the envelope.

The grid is operated at a potential positive with respect to the cathode, this voltage being supplied in any suitable manner, for example, as shown in Fig. 2, by batteries 8, 14, and 15 in series. Many of the electrons accelerated by the field between the grid and cathode will strike the grid wires and will constitute part of the grid current. Other electrons will pass through the mesh of grid wires and will then have sufficient kinetic energy to travel on and strike another or third electrode 3.

The electrode 3 may be of any suitable construction and in functioning in certain aspects of the invention the electrode 3 is so constructed that it is adapted to emit electrons upon bombardment by electrons, such as by electrons emitted from the first electrode, and when functioning in this manner the electrode 3, or third electrode, may be termed a dynode. For convenience, the electrons emitted by the cathode are called primary electrons and those emitted by the dynode are called secondary electrons. During operation of the device the third electrode may be operated at a potential lower than the second, being supplied by batteries 8 and 14 in series. The surface of the dynode may be sensitized in such a way that under conditions which will be more fully described hereinafter, more than one secondary electron is emitted for each primary electron that arrives. The secondary electrons are accelerated toward the grid by virtue of the fact that its potential is positive with respect to that of the dynode, and for the most part these secondary electrons strike the grid wires and constitute part of the grid current. The problem of the electrons which do not strike the grid wires will later be discussed in detail.

To maintain capacitance between the grid and dynode at a lower value, the dynode is mounted on a relatively long, thin rod 16 which is sealed through the envelope 4 and may be provided with threads 16a at its upper end.

The dynode current includes the primary electrons arriving from the cathode and a quantity of the secondary electrons emitted by the dynode. Under certain conditions to be described, the dynode current will decrease when the dynode voltage increases, this relation between current and voltage being called negative resistance.

The device may then be connected as a two-terminal element in any circuit, the dynode and cathode being the terminals, and the element will behave as a negative resistance over a voltage range.

This negative resistance characteristic arises from the fact that over this voltage range the primary electron current is substantially constant while the secondary emission current is nearly proportional to the dynode voltage.

I have found that from the viewpoint of alternating current only, this negative resistance relation also exists when the device is regarded as a two-terminal element with the dynode and grid as terminals. This relation is not apparent because it will be apparent that under conditions of constant grid voltage, when the dynode voltage increases and the dynode current decreases, the voltage between dynode and grid also decreases. An explanation of this phenomenon will be given later in connection with equivalent electrical circuits and characteristic curves of the device.

To utilize the negative resistance characteristic between dynode and grid to generate oscillations at very high frequencies, I have adapted the dynode and grid to serve as poles of a cavity resonator. This arrangement may be thought of as being electrically equivalent to a parallel tuned circuit connected between the dynode and grid, the capacitance of the tuned circuit being largely the capacitance between dynode and grid and the parallel inductance residing largely in the wall of the cavity resonator.

Cavity resonator 17 in Fig. 2 is adapted to be screwed to the threaded end 16a of the dynode rod 16. In order to maintain the grid and dynode at different direct current potentials grid disc 13 is separated from the cavity resonator by dielectric disc 19, which forms a capacitor that offers negligible impedance to the very high frequency alternating current generated, but isolates the grid and dynode for direct current. The capacitor may be enlarged and formed to the proper proportions by the addition of disc 18 attached to disc 13, the capacitor plates then being principally formed of disc 18 and the lower section of the cavity resonator. The dimensions of the disc, which is to say the dimensions of the space between the capacitor plates, may be so chosen that there will be substantially no radiation of the electromagnetic oscillations occuring inside the cavity resonator.

Oscillatory power may be abstracted or signals to be detected may be injected through loop 20 which couples the cavity resonator to a concentric transmission line 21. Alternatively, the cavity resonator may be directly coupled to an antenna or any other load by any other suitable means.

It will now be apparent that electron transit time between the cathode and the grid will not be a limitation on the frequency at which the device can be operated, since the cathode is not part of the high-frequency circuit. Thus the cathode-to-grid spacings may be greatly increased over what would be possible when the cathode-grid transit time of electrons is a limiting factor. The manufacture of the tube is thus facilitated because increased tolerances are allowed in holding the specified spacing between grid and cathode. It is particularly advantageous to have a relatively wide manufacturing tolerance for this particular spacing, because it is very difficult to maintain a smooth surface on a cathode coated with the alkaline-earth oxide commonly used.

Furthermore, the fact that the cathode is not a part of the high-frequency circuit and that the grid-cathode spacing may be allowed to vary makes possible the use of a directly-heated cathode wherein the electron-emissive coating is applied to the resistance wire in which the heat is generated. In order to provide a cathode which requires a minimum of heating power and has a low heating time, I provide a directly-heated cathode as is illustrated in the embodiment of the invention of Figs. 3 and 4.

The cathode comprises an assembly supported on mica disc 22, which in turn is mounted on pins 23, 24, and 25 sealed through the lower end of the envelope. The ends of filament wire 26 are welded to tabs 27 and 28, and tension applied to the wire by spring 29 attached to pin 24. Mica slots 30 and 31 guide the filament from pin 23 to the tension spring and to pin 25, the strand twice passing over the central aperture 32. In this region two sections of coating 33 and 34 are applied to the wire. A filamentary or directly-heated cathode has thus been constructed which is capable of emitting a stream of electrons which are accelerated by the positive potential applied to the grid 2. Where there is no limitation on the cathode heating power or on the heating time, I may use any other arrangement for producing an electron stream or an indirectly-heated cathode like that shown in Figs. 1 and 2 may be employed.

An additional advantage obtained by isolating the cathode from the high-frequency circuit arises from the fact that the capacitance between cathode and grid is a funtion not only of physical dimensions but also of the space charge in the grid-cathode region and hence of the temperature of the cathode. Were the cathode a part of the high-frequency circuit, therefore, variations in cathode temperature would change the frequency. This factor is equally as serious as variations in the mechanical dimensions. The space charge between grid and dynode depends largely of the voltages applied to these elements, and only secondarily on the cathode temperature. Therefore devices constructed according to this invention are relatively insensitive to variations in cathode temperature.

The device will generate oscillations at the resonant frequency determined by the cavity and tube dimensions and the applied voltages, and variations caused by mechanical shock or by manufacturing tolerances will change the operating frequency but will not halt the oscillations. The device is thus well-suited for operating under conditions where it is essential that the oscillations continue despite severe mechanical shock or dimensional and voltage variations arising from temperature changes or other sources.

It will be seen that the resonator 17 and the dynode support rod 16 may be treated essentially as a section of coaxial line shorted at the upper end and loaded at the lower end by the grid-to-dynode capacitance.

The resonant wave-length, in accordance with line theory, will be somewhat greater than four times the inside height of the resonator provided the diameter of the resonator is not considerably greater than the height. More specifically the relation between the wave length and the principal dimensions of the system is given by the line equation $$2\pi f C Z_0 \tan \frac{2\pi l}{\lambda} = 1$$

where $f$ is the resonant frequency, C is the grid-to-dynode capacitance, $Z_0$ is the surge impedance of the line determined by the outer diameter of the dynode rod and the inside diameter of the resonator, and $l$ is the distance between the upper and lower ends of the resonator.

In the structures described the dynode has been provided with a curved surface and the grid mesh 2, which is mounted on the grid disc 13, has likewise been formed into a curve. The object of this construction is to minimize undesirable effects of a phenomenon previously mentioned, the fact that some of the secondary electrons emitted from the dynode do not strike the grid wires but rather pass through the mesh into the grid-cathode region. Such an electron going through the grid will ordinarily have insufficient energy to return to the cathode; it travels part way to the cathode, then changes its direction and travels toward the grid. If it again passes through the grid, it may do one of several things: (1) arrive at the dynode and deliver energy to the oscillatory system in so doing; (2) arrive at the dynode and abstract energy from the oscillatory system; (3) again change its direction and go to the grid, leaving some oscillatory energy in the system if its velocity upon entering the grid-dynode region was greater than its velocity on leaving; (4) again change its direction and go to the grid, abstracting some oscillatory energy from the system if its velocity on entering the grid-dynode region was lower than its velocity on leaving. Additionally, a secondary electron which passes into the grid-cathode region depresses the magnitude of the primary electron stream, since it contributes to space charge just as a primary electron does.

The path of such an electron is shown by the dotted line in Fig. 5 extending from the dynode 3 past the grid 2, and into the grid-cathode region. In view of the four conditions listed above, it is evident that the part played by a returning secondary electron will depend in some measure upon the direct current potentials and upon the frequency. Under certain conditions, it is possible to adjust the direct current potentials to favor the occurrence of conditions (1) or (3).

Curve $P_s$ of Fig. 7, a plot of power output as a function of direct grid voltage, shows the irregular manner in which the power output is influenced by electrode potential when the electrodes are constructed with flat surfaces as in Fig. 5. The power output does not increase smoothly as the grid voltage is increased, and for most efficient operation it is necessary to select a grid voltage which will place the operating point near the top of one of the humps of this curve.

In this embodiment of the invention the necessity for choosing and maintaining such a grid voltage is avoided by controlling the path of the electron stream, such as by the use of the curved grid and dynode as shown in Figs. 1, 2, and 3. The path of an electron traveling in such an electrode system is shown in Fig. 6. The electron is emitted from the dynode and travels in a direction normal to the surface of the grid and hence has a radial component of momentum which remains substantially unchanged as the electron passes the grid. This radial component of velocity will carry the electron beyond the limit of the grid mesh and thus when the electron returns to the grid it strikes the solid disc and is prevented from reentering the grid-dynode region. The power output as a function of grid voltage is shown on curve $P_c$ in Fig. 7. The power increases relatively smoothly and continuously as the grid voltage is increased, and the efficiency does not exhibit maximum and minimum values as the grid voltage is changed. A device with this construction is more readily adaptable to a variety of operating conditions, and, moreover, variations in operating conditions will not have such marked effects on the efficiency.

An embodiment of the device particularly adapted for coupling the power directly to an antenna is shown in Figs. 8 and 9. The cavity resonator, instead of being insulated from the grid disc 13 and forming a capacitor in conjunction with the grid disc, may be directly connected to the periphery of the grid disc. The direct current supply may be connected directly to an external portion of the resonator for energizing grid 2, and, through a suitable impedance, not shown, to antenna extension 12 of dynode rod 16. Alternatively, the direct current connectors and by-pass capacitor of Fig. 2 may be used. The antenna extension, which is rigid with disc 34, is threaded to the upper end of dynode rod 16. Disc 34, with the upper end of the cavity resonator, forms a capacitive coupling between the resonator to the dynode rod. Rod 16 is not, as in Fig. 2, screwed directly to the cavity resonator but passes through an aperture in the top of the resonator and is electrically insulated from the resonator.

With an antenna of the form shown in Fig. 9, more efficient radiation is obtained by surrounding the cavity resonator with slot 37 bounded by cylindrical wall 38. If the slot is made one-quarter wave-length long, it will prevent high frequency energy from traveling around the outside of the cavity and being lost by going down the line to the batteries or to ground.

This construction is not limited to direct connection to an antenna, however, and may be employed as shown in Fig. 10 to couple between the cavity resonator and a transmission line. The outer conductor of the concentric transmission line 21 is joined to the wall of the resonator as in Fig. 2, while the inner conductor is joined directly and smoothly through extension of the dynode rod. With this arrangement it is necessary to make an additional provision for supplying the positive direct voltage to the dynode rod, and in Fig. 10 transmission line 35 is shown tapped into transmission line 21 so that positive voltage may be supplied through its inner conductor to the dynode rod. Transmission line 35 may be left open at the end and may be made one-quarter wave-length long so as to present an infinite impedance at the operating frequency. Transmission line 21 is to be terminated in a device having substantially zero conductance unless a by-pass arrangement is used such as that designated by numerals 18 and 19, Fig. 2.

A clearer understanding of the manner in which the device generates high frequency oscillations may be obtained by referring to Fig. 11, a partial electrically equivalent circuit of the structure shown in Fig. 2. The electrodes have been represented by the conventional symbols used for a triode, although it is recognized that the grid 2 is collector and accelerator rather than a control electrode and that the dynode 3 is a secondary emitter and not an ordinary anode. Cavity resonator 17 corresponds closely to an inductor in a network of lumped circuits, and has been replaced in Fig. 11 by inductor L, which is also assigned the numeral 17 to aid in identifying it with the cavity resonator. The inductor L forms a parallel resonant circuit in conjunction with capacitance C, the capacitance between the dynode and the grid of the device, which is shown in dotted lines.

The heater coil and the battery are omitted, but the dynode battery 14 and the grid battery 15 which acts in series with the dynode battery to supply grid potential are shown connected as in Fig. 2. The parallel resonant circuit is not formed by directly connecting together the ends of the capacitance C and inductor L—they are connected at their upper ends but their lower ends are separated by capacitor 19, which is assigned the same reference numeral as the dielectric disc 19 of Fig. 2 which separates the capacitor plates formed by the disc 18 and the lower end of the cavity resonator.

The lower end of the inductor L and the capacitance C which form a parallel resonant circuit are thus operated at different direct potentials, and for a fuller explanation of the operation of this circuit reference is made to Fig. 12. Here a capacitor C has been indicated in full lines, while the electron stream between dynode and grid has been replaced by resistor R and the electron stream between the grid and cathode has been replaced by resistor R'. The remainder of the circuit is identical with Fig. 11 including the small inductor 20 which replaced the coupling loop 20 of Fig. 2 and the load resistor $r'$ which takes the place of the antenna or whatever load is connected to the transmission line 21 of Fig. 2.

It is necessary to examine closely the voltage and current relations in this circuit and the nature of the so-called resistors R and R' which we have used to replace the electron currents within the tube. Capacitor 19 has substantially no impedance at the operating frequency— thus there is no alternating voltage between the lower end of the capacitor C and the inductor L. The potential difference between these points is always constant and equal to the voltage of battery 15.

The current $i_d$ which flows through the resistor R is the electron current between the dynode and grid. For reference, let the cathode, or the lower end of resistor R', be the point of zero potential. Then the grid, the point between resistors R and R', is always at the constant voltage $E_g$, the voltage of batteries 14 and 15 in series. The electron current $i_d$ between grid and dynode will then be obtainable from the direct current characteristic curves for the dynatron for a grid voltage $E_g$, and a dynode voltage $e_d$.

The instantaneous dynode voltage $e_d$, it should be noted, is the sum of the direct potential $E_d$ of the dynode battery 14 plus an alternating voltage at the operating frequency. The resistor R, therefore, may be regarded as a device in which the current is equal to the dynode current obtained from the direct current characteristic for a grid voltage of $E_g$ and a dynode voltage of $e_d$. Higher harmonics of the operating frequency are negligible in the alternating component of the dynode voltage $e_d$ because the resonant response of the tuned circuit composed of L and C is so sharp that negligible voltage is developed at the second and higher harmonic of the operating frequency.

The dynode current, of course, has a direct component $I_d$ which flows through the inductor L and higher harmonics which flow through the capacitor C without developing any voltage across the resonant circuit which would affect the dynode voltage $e_d$. We shall find it necessary later to investigate the wave form of the dynode current, noting now merely that the direct current component $I_d$ flows in the lead from battery 14 to inductor L.

There is no alternating component of voltage across battery 15 because the capacitor offers such low impedance to alternating current, and hence there is not alternating current component of voltage across batteries 14 and 15 in series. A simplified equivalent circuit may be drawn showing only those circuit elements which have flowing in them a component of alternating current. Such a circuit is shown in Fig. 13 in which the battery and the resistor R' have been omitted. Since there is no longer any direct current flowing in this circuit, and since no alternating current component of voltage appears across capacitor 19, it has been replaced by a short circuit. It is necesary to consider carefully the nature of R in this new connection.

There is now no direct current component flowing in R, and it must be regarded as a device whose current variations with voltage variations follow those of the dynode current on the direct current characteristic curve of the device. That is, if we take the lower end of this resistor R as a reference point of zero potential, and let the upper end of the resistor be at potential $e_d$, a sinusoidally varying voltage, then a change in the current $i_d$ through the resistor R corresponding to a change in the dynode voltage $e_d$ will be equal to the change in the dynode current on the dynatron characteristic curve for grid voltage $E_g$ for a corresponding change in the dynode voltage.

It has been previously pointed out that the electron transit time between cathode and grid has no effect on the operation of the device and is not a limit to high frequency operation, and this statement is reaffirmed by the absence of the resistor R' in the electrically equivalent circuit of Fig. 13. The resistor R, however, representing the electron path between grid and dynode, remains in the circuit, and the electron transit time between dynode and grid seriously affects the magnitude of R when the transit time is an appreciable fraction of the period of a cycle of oscillation, the consequence being a reduction in the power obtained. The following discussion will not take into consideration the effect of transit time, but after the operation of the device has been explained, reference will again be made to electron transit time in the grid-dynode region.

A further simplification of the electrically equivalent circuit of Fig. 13 may be achieved by replacing the inductor 20 and the load resistor $r'$ by a resistor $r$ in series with the inductor L, as shown in Fig. 14. The new electrically equivalent load resistor $r$ is related to the actual load $r'$ by the equation $$r = \frac{r'}{b^2}$$

where $b$ is the transformation ratio between inductors L and 20 and depends on the number of turns in each inductor and the mutual flux linking the two.

The problem has now been reduced to a two-mesh network susceptible of analysis by well-known methods. Let $i_1$ and $i_2$ be the currents in the two meshes (the current in the capacitor is the difference between these two currents). Summing the voltage drops around the two meshes gives the equations $$R\frac{di_1}{dt} + \frac{i_1}{C} - \frac{i_2}{C} = 0$$

$$L\frac{d^2i_2}{dt^2} + r\frac{di_2}{dt} + \frac{i_2}{C} - \frac{i_1}{C} = 0$$

If the peak value $V_0$ of the capacitor voltage occurs at $t=0$ and the initial value of the current through the inductor is 0, the solution is $$i_2 = \frac{V_0}{\omega L} e^{at} \sin \omega t$$

$$i_1 = \frac{V_0}{R} e^{at} \left[ \frac{1}{2}\left(\frac{1}{\omega CR} - \frac{r}{\omega L}\right) \sin \omega t - \cos \omega t \right]$$

where $$a = -\frac{1}{2}\left(\frac{r}{L} + \frac{1}{rC}\right)$$

$$\omega = \sqrt{\frac{1}{LC} - \left(\frac{r}{2L} - \frac{1}{2RC}\right)^2}$$

In a passive network with all the circuit elements positive, it is evident that the coefficient $a$ in the exponential term would be negative and the oscillations would rapidly die away. It will be remembered, however, that the resistor R in this circuit may be capable of supplying power, withdrawn from the batteries, under the proper conditions. If oscillations are not to cease, the exponential coefficient $a$ must be zero or positive; that is, $$-\frac{1}{2}\left(\frac{r}{L} + \frac{1}{RC}\right) \geqq 0$$

which implies that $$0 > R \geqq -\frac{L}{rC}$$

It will be evident that if $a$ is positive, oscillations will increase in magnitude, while if $a$ is zero, they will be constant in magnitude.

An examination of this inequality shows that R must be negative and that in absolute value it must be less than $$\frac{L}{rC}$$

the shunt resistance of the circuit. On a voltage-current plot, as in Fig. 15, if a negative resistance is drawn with slope $L/rC$, then R must be represented by a line lying between this line and a horizontal line. Such a negative resistor is a device the current through which will decrease when the voltage is increased. It has already been pointed out that the resistor R shown in these circuits is a device whose current varies with voltage change in the same way that the dynode current changes with the dynode voltage on the direct current characteristic curve of the device. It now remains to show how this negative resistance characteristic is secured by the secondary emitting properties of the dynode.

It has been stated that the equations above are for the oscillatory solutions of the differential equations of the circuit of Fig. 14. It should be pointed out that a requirement for oscillation even more fundamental than that discussed is that the expression for the frequency constant $\omega$ shall be real; that is, the expression under the radical must be positive, or $$\frac{1}{LC} > \left(\frac{r}{2L} - \frac{1}{2RC}\right)^2$$

Since in the device the minimum value of R is always limited, and the oscillations always increase to a point at which $$R = \frac{L}{rC}$$

the equality holding rather than the inequality, the expression for the frequency constant reduces to $$\omega = \sqrt{\frac{1}{LC} - \frac{r^2}{L^2}}$$

and the fundamental requirement for oscillation is $$r < \sqrt{\frac{L}{C}}$$

Under this condition the lines labeled R and $$-\frac{L}{rC}$$

in Fig. 15 coincide.

A simple alternative solution for steady oscillation may be obtained by noting the oscillations will be sustained in the circuit of Fig. 14 if the impedance of any loop containing all the elements is zero. Thus the parallel combination of R and C in series with the series combination of $r$ and L form a loop, and the impedance around this loop is $$\frac{R\frac{1}{j\omega C}}{R + \frac{1}{j\omega C}} + r + j\omega L = 0$$

which may be reduced to $$R + r - \omega^2 LRC + j\omega(rCR + L) = 0$$

Equating the real part to zero gives $$\omega = \sqrt{\frac{1}{LC} + \frac{r}{LCR}}$$

and equating the imaginary part to zero gives $$R = -\frac{L}{rC}$$

Substituting this relation in the equation for the frequency constant gives, as before, $$\omega = \sqrt{\frac{1}{LC} - \frac{r^2}{L^2}}$$

The expression for the instantaneous power output is $$p = i_2^2 r$$

and the average power is $$P = \frac{V_0^2}{2} \frac{r}{\frac{L}{C} - r^2}$$

Under the condition that $$r < \sqrt{\frac{L}{C}}$$

necessary for oscillation, it is evident that the power will increase as $r$ is increased; hence the ratio $L/C$ is a factor which limits the power that may be obtained from the device and an important design consideration is that C should be made as small as possible. It has been explained that a low value of C is obtained in the embodiments of Figs. 1 to 4 by mounting the dynode on the long rod 16.

The effect of electron transit time at high frequency is to increase the magnitude of the negative resistance R exhibited by the electrode system; that is, when the line R in Fig. 15 represents a portion of the tube characteristic, transit time effects make the line move nearly vertical.

Since $r$ varies inversely with $|R|$ in the equation $$|R| = \frac{L}{rC}$$

an increase in $|R|$ decreases the value of $r$ which may be used and decreases the power output.

Experimental direct current characteristic curves obtained with the aid of a circuit shown schematically in Fig. 16 are necessary to show how the electrode system exhibits the negative resistance property necessary to the operation which has been described. The cathode 1 is taken as a reference point of zero potential and grid 2 is maintained at a constant potential $E_g$ by means of battery 15. The dynode 3 is connected to a tap on battery 15 so that its voltage may be adjusted to any value from zero to $E_g$.

The dynode voltage $E_d$ may be varied continuously over this range and the corresponding values of dynode current $I_d$, grid current $I_g$ and cathode current $I_k$ may be determined. These three curves are plotted as solid lines in Fig. 17 and satisfy the relation $$I_k = I_d + I_g$$

Over a portion of the range of values of dynode voltage $E_d$, the dynode current $I_d$ decreases as the voltage increases and exhibits the negative resistance characteristics required for operation in the previously described oscillatory circuits. The manner in which the electrodes operate over this voltage range will be further described after a discussion of the way in which these characteristic curves are produced by the secondary emitting properties of the dynode.

If there were no secondary emission at the dynode and the cathode were the sole supplier of electrons for the device, the cathode current would not exhibit the dip in the central portion as shown on curve $I_k$ but would increase from a minimum value at zero dynode voltage to a maximum value for a dyanode voltage equal to the grid voltage, as shown by the dotted curve labeled $I'_k$ in Fig. 17. When the dynode voltage is zero the electrons can pass through the grid but cannot reach the dynode. Thus with zero voltage on the dynode, the grid current comprises the entire cathode current. At the other extreme, when the dynode voltage is equal to the grid voltage $E_g$, the cathode current will be slightly increased and a major share of the electrons from the cathode will reach the dynode rather than the grid. The cathode current increases only a small amount because the shielding effect of the grid prevents a change in dynode voltage from producing any but a minor change in electric field near the cathode. At some intermediate value of dynode voltage there would be some intermediate value of current in the dynode circuit.

Under this condition of no secondary emission, the dynode would begin to capture electrons as soon as the voltage is increased slightly above zero, the magnitude of the grid current meanwhile decreasing. After this initial rise in dynode current, the change in both dynode current and grid current becomes less pronounced.

The behavior of the primary electron stream to the dynode under these conditions is shown by dotted curve labeled I'$_p$ in Fig. 17, which follows the experimental dynode current curve during its initial rise, and then increases gradually and continuously as the dynode voltage increases. Dotted curve I'$_q$, the primary electron current to the grid with no secondary emission, correspondingly follows the experimental grid current curve during its initial drop and then decreases slowly but continuously as the dynode voltage increases. Those three dotted curves must satisfy the relation $$I'_k = I'_p + I'_q$$

In the presence of secondary electrons, however, these three curves are depressed to the values indicated by the curve labeled I$_k$, the experimental total cathode current, I$_p$, the primary dynode current in the presence of secondary emission, and I$_q$, the primary electron current to the grid in the presence of secondary emission from the dynode. The three curves satisfy a similar relation, $$I_k = I_p + I_q$$

The drop in the central section of the total cathode current I$_k$ is principally accounted for by the fact that secondary electrons emitted from the dynode pass through the grid into the grid-cathode region where they contribute to the space charge of this region and so act to limit the electron flow from the cathode. At zero dynode voltage the curve I'$_k$ coincides with I$_k$ because there is no secondary emission in the absence of any primary electrons arriving at the dynode. For a dynode voltage equal to the grid voltage E$_g$, I$_k$ and I'$_k$ also coincide since there can be no secondary electrons leaving the dynode because of the absence of any field between grid and dynode.

The magnitude of the secondary emission current leaving the dynode, which is shown by the dotted curve labeled I$_s$ in Fig. 17, depends upon the number of primary electrons arriving at the dynode, the energy with which the primary electrons arrive, and the potential difference between dynode and grid. As the dynode voltage rises above zero and primary electrons begin to arrive at the dynode, the secondary electron current does not begin to flow apparently until some critical energy of primary electrons has been reached. The energy with which the primary electrons arrive at the dynode is, of course, substantially proportional to the dynode voltage. After this critical value has been reached, the number of secondary electrons emitted is substantially a linear function of the number of primary electrons arriving and of the energy with which the primary electrons arrive, provided the primary energies are not in excess of a few hundred electron volts. Since the number of primary electrons, shown by curve I$_p$ is substantially constant from this point on, the number of secondary electrons emitted is almost directly proportional to the energy with which the primary electrons arrive, or to the dynode voltage. There is a limit to this linear increase, however, as will be seen from the discussion to follow.

The potential difference between dynode and grid increases as the dynode voltage decreases and the secondary electron current, assuming the supply of electrons to be unlimited, will be limited by space charge. Under this condition, the secondary electron current will be approximately in proportion to the three-halves power of the difference in potential between dynode and grid.

Below curve I$_s$ is the intersection of curves I″$_s$ and I‴$_s$ which indicates where the previously discussed linearly-increasing secondary electron current meets the space-charge limited three-halves power curve. Thus we may say that as the dynode voltage increases, the secondary electron current first increases along curve I‴$_s$ until it meets the intersection with the space charge limit curve I″$_s$, and then decreases along this curve as the dynode voltage is further increased. If the electron beam were uniform in intensity and distances between electrodes were perfectly uniform, and if the secondary emissive characteristic of the dynode were uniform over its entire surface, then the secondary electron current would actually come to a point at its minimum value as shown by the intersection of curves I″$_s$ and I‴$_s$. These uniformities are not realized in practice, however, and as a result the actual curve I$_s$ is rounded at the minimum value. The primary electrons arriving at the dynode will contribute to the space-charge in the grid-dynode region and prevent the secondary electron current from following precisely a three-half power curve, but even taking into consideration the primary current, it is sufficiently correct to say that the algebraic sum of primary and secondary electron currents follows a three-halves power law.

It is now clear how the actual dynode current I$_d$ acquires its negative resistance characteristic. The total dynode current I$_d$ is the sum of the primary and secondary electron currents, $$I_d = I_p + I_s$$

and, since the primary current I$_p$ is substantially constant over a large portion of the range of dynode voltage, the total dynode current I$_d$ follows the contour of the curve for I$_s$ shown in Fig. 17.

The grid current I$_g$, on the other hand, has a maximum value corresponding to the minimum value of this dynode current, since the secondary electrons emitted by the dynode eventually arrive at the grid. Also, we may say that at any voltage the grid current will be given by $$I_g = I_q - I_s$$

Devices exhibiting a negative resistance characteristic have previously been suggested as oscillators and detectors with a parallel resonant circuit between dynode and cathode as described by A. W. Hull in an article entitled "The Dynatron" in the Proceedings of the Institute of Radio Engineers for February 1918, vol. 6, page 5.

In operation of the previously-described embodiments of my invention a value of grid voltage E$_g$ is chosen and consequently with it a particular curve of dynode current $i_d$. A dynode battery voltage E$_d$ is chosen and this determines a quiescent point Q on the dynode current curve $i_d$ which has been redrawn in Fig. 18 to illustrate these points. A load line LL may be drawn through the quiescent point Q, the slope of this line corresponding to the negative reciprocal of the shunt resistance of the circuit at resonance. Since the numerical value of the slope of this line is less than the slope of the substantially straight part of the dynode current curve, any random variation in conditions will start oscillations in the system and in accordance with the equations given above the oscillations will build up as long as the total dynode current and the dynode voltage corresponding to the fundamental frequency vary along the curve between limits which will be specified in the following discussion.

The oscillations cannot continue to build up indefinitely because of the limited extent of the negative slope part of the dynode current curve. The oscillations rapidly build up until the voltage swings past at least one of the maximum and minimum points P and P¹ and reaches some points M and N at which the average value of the negative resistance exhibited between the dynode and grid is equal to $$-\frac{L}{rC}$$

and the magnitude of the oscillations becomes stable.

Since substantially no voltage at other than the operating frequency can be developed across the sharply-tuned parallel resonant circuit illustrated in Figs. 11 to 14, the dynode voltage is essentially a direct component plus a sinusoidal component at the operating frequency, $$e_d = E_d + V_0 \sin \omega t$$

where V$_0$ is the peak capacitor voltage previously assumed to exist in the analysis of Fig. 14. If a value of V$_0$ is assumed, points M and N may be located on the dynode current curve opposite dynode voltage values $E_d - V_0$ and $E_d + V_0$.

While the dynode voltage assumes substantially a sinusoidal form because the impedance of the parallel resonant circuit is high at resonance and low at other frequencies, the dynode current has an irregular wave shape determined by the characteristic curve of Fig. 18 and comprised of a direct component and a number of harmonically related alternating components of which the first harmonic is to be considered as a sinusoidal current of operating frequency. A direct component $I_d$ flows through the inductor L, a fundamental frequency component $I_{d1}$ at the operating frequency divides between the branches of the resonant circuit, and higher harmonic components flow through the capacitor C.

The first step in evaluating these currents is to plot a cycle of the dynode electron current, and such a plot has been shown in Fig. 20 since it is also required to explain the manner in which the device acts as a detector. The curve of dynode current in Fig. 20 for a full cycle of oscillation is obtained from the direct current characteristics of Fig. 18 with the aid of a plot of dynode voltage over a full cycle. Let $t$ equal 0 at point Q (Fig. 18) where the dynode voltage has its average value $E_d$ and the value of the dynode current $I'_d$. The dynode voltage will vary sinusoidally about the value $E_d$; let it first swing down to the value $E_d - V_0$ and then up to the value $E_d + V_0$ as shown in Fig. 19.

To plot the value of dynode current over a corresponding cycle, select any value of the angular position $\omega t$ in degrees, determine the value of the dynode voltage $e_d$ from Fig. 19, and find the corresponding value of dynode current $i_d$ from Fig. 18. The resulting curve is drawn in Fig. 20 and shows how the dynode current starts at the value $I'_d$ corresponding to the points on the curve, moves up to point M, swings back over the entire curve through Q to point N and then returns to Q, twice traversing the peak P, and the minimum value P'.

For the particular curve shown the dynode voltage becomes negative during the first half-cycle and point M is located to the left of the vertical axis. In this region the dynode current is zero.

With the aid of this curve showing a cycle of the dynode current $i_d$ the harmonic coefficients previously mentioned may be obtained and the value of the dynode current may be expressed as $$i_d = I_d + I_{d1} \sin(\omega t + \phi_1) + I_{d2} \sin(\omega t + \phi_2) + \ldots$$

by means of the Fourier coefficient relations $$I_d = \frac{1}{2\pi} \int_0^{\frac{2\pi}{\omega}} i_d dt$$

$$I_{d1} = \sqrt{S_1^2 + C_1^2}$$

$$I_{d2} = \sqrt{S_2^2 + C_2^2}$$

$$\phi_1 = \tan^{-1} \frac{C_1}{S_1}$$

$$\phi_2 = \tan^{-1} \frac{C_2}{S_2}$$

where $$S_1 = \frac{1}{\pi} \int_0^{\frac{2\pi}{\omega}} i_d \sin \omega t \, dt$$

$$S_2 = \frac{1}{\pi} \int_0^{\frac{2\pi}{\omega}} i_d \sin 2\omega t \, dt$$

and $$C_1 = \frac{1}{\pi} \int_0^{\frac{2\pi}{\omega}} i_d \cos \omega t \, dt$$

$$C_2 = \frac{1}{\pi} \int_0^{\frac{2\pi}{\omega}} i_d \cos 2\omega t \, dt$$

The intervals may be evaluated by plotting the indicated functions and measuring the areas. In particular the direct current component $I_d$ is simply the average value of the instantaneous current $i_d$ over the cycle, and may be obtained by measuring the areas of the loops in Fig. 20. Since the second and higher harmonics flow almost entirely through the capacitor, the constants $I_{d1}$ and $\phi_1$ would be used in computing the oscillatory power output.

The originally assumed value of $V_0$ can now be checked by the relation $$V_0 = I_d \frac{L}{rC}$$

and if the calculated value is not equal to the assumed value a new assumption may be made and the calculation repeated.

It must be emphasized that the foregoing analysis does not take into consideration the effect of electron transit time between dynode and grid. Transit time alters the phase relation between dynode current and voltage. Thus the real part of the negative resistance of the gap across the electrodes is increased, the result being, in the final analysis, a reduction of power output to an amount which may be considerably below the value otherwise predicted.

In view of the fact that transit time is lowered as the average voltage between grid and dynode is increased, best operation with greatest power-output at microwave frequencies is obtained when point Q is moved well to the left of midway between the points of maximum and minimum dynode currents such as is shown in Fig. 21. In general, it is found that as frequency is increased the optimum position of point Q is moved to the left, although oscillation will not start if Q is set to the left of P, Fig. 18.

The manner in which the device acts as a detector may now be explained with the aid of Figs. 20 and 21. Suppose the device as shown in Fig. 2 be oscillatory at its resonant frequency and a received signal, differing in frequency by an amount $\Delta f$, be introduced into the cavity by means of the coupling loop 20. It may be shown analytically that the effect of the received signal is to vary the slope of the load line LL of Fig. 18 at a frequency of $\Delta f$ and by an amount which is a function of the intensity of the received signal and its frequency.

Three members of the infinite set of load lines are shown in Fig. 21, lines LL, LL', and LL''. These lines all have different slopes but all pass through the same quiescent point Q which is determined by the battery voltages. Considering the manner in which the current curve of Fig. 18 is derived, it is clear that a shift in the slope of the load line will change the shape of this current curve. Furthermore, the shifting load line will change the positive and negative loops of the current curve by different amounts and so shift the location of the average value $I_d$.

As the load line shifts from LL to LL' in Fig. 21, the area enclosed by the large negative current loop of Fig. 20 will be diminished by a larger amount than is the smaller positive loop, and the value of $I_d$, the direct current component of $i_d$, will then increase. Alternatively, as the lead line shifts to LL'', the area within the negative loop will increase more than that of the positive loop and the value of $I_d$ will be decreased. Since $I_d$ is the direct current component of the dynode current and is the value of current drawn from the dynode battery 14, the variation in the value of $I_d$ may be obtained as a beat-frequency signal across a resistor in the lead from the dynode battery to the resonant circuit (cavity resonator). As shown in Fig. 22, the voltage variations across this resistor 35 may be applied to an amplifier. It will be appreciated that for greatest sensitivity, operating point Q is to be chosen near point P or P', Fig. 18, where greatest asymmetry exists.

In view of what has been said about the effect of transit time upon performance at microwave frequencies, it is seen that point Q is placed near point P rather than near point P'. The voltages and the grid-dynode spacing may be so chosen that the best position of Q for oscillation and detection is about the same and is near P. The location of Q for best power can be changed by changing the grid-dynode spacing. Thus, if the grid-dynode spacing is increased, transit time is increased and Q for maximum power will move to the left. Such a design is carried out for a given grid voltage; that is, of the three parameters, grid voltage, dynode voltage, and grid-dynode spacing, two may be chosen within reasonable limits and the third chosen to place Q for best detection and best oscillation at the same point.

If the oscillator of Fig. 22 is to be used as a modulator rather than as a detector, the modulating voltage is applied across resistor 35. The resulting modulated oscillation is delivered to loop 20. The modulation may otherwise be applied to the several oscillators shown by connection of the modulation source in the B-supply lead of the cathode or the grid. Alternatively a modulated signal may be obtained by modifying the tube to include a control element (not shown) such as a beam-focusing electrode or a control grid adjacent the cathode, with the modulation source connected between the cathode and the additional electrode.

Although I have thus far described my invention in connection with embodiments particularly adapted to be used at ultra-high frequencies, there is also a special advantage to be gained by employing the invention at lower frequencies where the effects of electron transit time between grid and dynode are negligible but at which the reactance of the cathode lead is not negligible. At such frequencies, resonant transmission lines or lumped circuits would be used rather than a cavity resonator, and, I am able to secure increased oscillatory output from the device by placing the resonant circuit directly across grid and dynode, thus eliminating the loss which would be encountered if the resonant circuit is placed between dynode and cathode as was done in the prior art at frequencies of the order of kilocycles per second.

This class of operation may be accomplished by the circuit shown schematically in Fig. 23, where the inductor L and the capacitor C represent a parallel resonant circuit which may be composed of lumped constants or a tuned transmission line. A radio-frequency choke 36 is connected in series with the lead from the grid battery 15 to the grid 2 to prevent loss of power through the battery, and the lead from the dynode battery 14 is connected to a point of the resonant circuit.

Although it is not evident in the prior art, under these conditions I have found that the magnitude of the oscillations is greater than if the resonant circuit is placed across the dynode and cathode as in the older connection.

An alternative circuit which omits the cathode as part of the high frequency system is shown schematically in Fig. 24 being, in a way, simply a variation of the circuit shown in Fig. 23. One end of the resonant circuit is connected directly to the grid, and capacitor 19, which permits grid and dynode to operate at different direct potentials, is connected between the resonant circuit and the dynode. A radio frequency choke 36 is connected between the dynode and the dynode battery 14, while the grid battery 15 is connected to the other end of the resonant circuit.

Although I have shown and described particular embodiments of my invention, I do not desire to be limited to the embodiments described, and I intend in the appended claims to cover all modifications which do not depart from the spirit and scope of my invention.

What I claim is:

1. Electron discharge apparatus including an evacuated tubular envelope containing an electrode system including a first electrode comprising a conducting wire adapted to be heated by an electric current and coated over a portion of its length with thermionic electron-emissive material, a second electrode comprising a curved mesh of wires, and a third electrode having a convex surface adapted to emit electrons when bombarded by electrons thermionically emitted by said first electrode and accelerated by said second electrode, the surface of said third electrode having the property of emitting a greater number of electrons than the number of bombarding electrons, means including conducting members sealed through one end of said envelope for supporting said conducting wire of said first electrode in a plane perpendicular to the axis of said envelope, a conducting disc sealed through said envelope parallel to said first electrode for supporting said second electrode with its convex side facing said first electrode, means including a conducting rod sealed through the other end of said envelope and extending along the axis of said envelope for supporting said third electrode with its convex surface facing the concave side of said second electrode, a condenser plate connected to the exterior end of said rod, a cavity resonator comprising a cylindrical conductor having one end open and extending into proximity with the periphery of said disc to form a capacitor in conjunction with said disc and having its other end shorted by a conductor disposed adjacent said condenser plate, and means for connecting a lead device to said condenser plate having a conductor extending through a central aperture of said conductor disposed adjacent said condenser plate.

2. Electron discharge apparatus including an evacuated elongated envelope containing an electrode system including a first electrode comprising a conducting wire adapted to be heated by an electric current and coated over a portion of its length with thermionic electron emissive material, a second electrode comprising a curved mesh of wires, and a third electrode having a convex surface adapted to emit electrons when bombarded by electrons thermionically emitted by said first electrode and accelerated by said second electrode, the surface of said third electrode having the property of emitting a greater number of electrons than the number of bombarding electrons, means including conducting members sealed through said envelope for supporting said conducting wire of said first electrode in a plane perpendicular to the axis of said envelope, a conducting disc sealed through said envelope parallel to said first electrode for supporting said second electrode with its convex side facing said first electrode, means including a conducting rod sealed through the other end of said envelope and extending along the axis of said envelope for supporting said third electrode with its convex surface facing the concave side of said second electrode, and a cavity resonator comprising a cylindrical conductor having one end shorted by a conductor connected at its center to said rod and its other end open and extending into proximity with the exterior periphery of said disc to form a capacitor in cooperation with said disc.

3. Electron discharge apparatus including a cavity resonator and an evacuated envelope inclosing an electrode system, said electrode system including a first electrode adapted to emit electrons, a second electrode adapted to attract electrons, and a third electrode adapted to emit electrons when bombarded by the electrons from said first electrode, the surface of said third electrode having the property of emitting a greater number of electrons than the number of bombarding electrons, means including a conducting member sealed through said evacuated envelope for making electrical connection to said third electrode, and means for supporting said second electrode and making electrical connection thereto comprising a conducting disc with a central aperture sealed through said envelope having its periphery external to said envelope and said second electrode attached adjacent to the circumference of said central aperture, and a cavity resonator comprising an exterior conducting member connected to said conducting member sealed through said envelope and adapted to extend into proximity with said periphery of said conducting disc and form a capacitor in cooperation with said disc.

4. Electron discharge apparatus including a cavity resonator and an evacuated envelope containing an electrode system, said electrode system including a first electrode adapted to emit electrons, a second electrode adapted to attract electrons, and a third electrode adapted to emit electrons when bombarded by the electrons emitted from said first electrode, the surface of said third electrode having the property of emitting a greater number of electrons than the number of bombarding electrons, and means including a rod sealed through said envelope for supporting said third electrode, said cavity resonator including an external conducting member connected to said rod and said second electrode and said third electrode serving as poles of said cavity resonator.

5. Electron discharge apparatus including an electrode system and a cavity resonator, said electrode system including a first electrode adapted to emit electrons, a second electrode adapted to attract electrons, and a third electrode adapted to emit electrons when bombarded by the electron emitted from said first electrode, the surface of said third electrode having the property of emitting a greater number of electrons than the number of bombarding electrons, said cavity resonator including a conducting member and means connecting said conducting member to said third electrode, and means connected to said second electrode for forming a capacitor in cooperation with said conducting member.

6. Electron discharge apparatus adapted to act as an oscillation generator and as a detector including a cavity resonator, a first electrode adapted to emit electrons, a second electrode adapted to serve as a first pole of said cavity resonator, a third electrode adapted to emit electrons when bombarded by electrons emitted by said first electrode and adapted to serve as a second pole of said cavity resonator, the surface of said third electrode having the property of emitting a greater number of electrons than the number of bombarding electrons, an impedance, and means for connecting said impedance in series with a source of direct current between said first electrode and said third electrode.

7. Electron discharge apparatus including a cavity resonator, a first electrode adapted to emit electrons, means including a second electrode having a first portion adapted to form a capacitor in conjunction with said cavity resonator and a second portion adapted to serve as a first pole of said cavity resonator, and a third electrode adapted to emit electrons when bombarded by the electrons from said first electrode and adapted to serve as a second pole of said cavity resonator, the surface of said third electrode having the property of emitting a greater number of electrons than the number of bombarding electrons.

8. Electron discharge apparatus including a cavity resonator and means to generate oscillations within said cavity resonator including a first electrode adapted to emit electrons, a second electrode adapted to attract electrons, and a third electrode adapted to emit electrons upon being bombarded by electrons emitted by said first electrode, said second and third electrodes having direct high-frequency connections to said resonator, the surface of said third electrode having the property of emitting a greater number of electrons than the number of bombarding electrons.

9. Electron discharge apparatus including a cavity resonator, a first electrode adapted to emit electrons, a second electrode adapted to accelerate the electrons emitted by said first electrode and connected as a first pole of said cavity resonator, and a third electrode adapted to emit electrons upon bombardment by electrons emitted from said first electrode and connected as a second pole of said cavity resonator, the surface of said third electrode having the property of emitting a greater number of electrons than the number of bombarding electrons.

10. Electron discharge apparatus including a cavity resonator, means including a plurality of electrodes for generating oscillations within said cavity resonator, and means for transmitting said oscillations to a load device exterior to said cavity resonator and for transmitting oscillations from an exterior source into said resonator including a condenser plate disposed adjacent a wall of said cavity resonator and opposite an aperture in said wall, means connecting said condenser plate to one of said electrodes, a coaxial transmission line having its outer conductor attached to said wall of said cavity resonator, and means connecting said condenser plate to the inner conductor of said coaxial line through said aperture in said wall of said resonator, and means for supplying direct current to said electrode system including a second coaxial transmission line having its inner and outer conductors connected respectively to said first coaxial transmission line, and means for connecting the center conductor of said second coaxial transmission line to a source of direct current.

11. Electron discharge apparatus including a cavity resonator having a wall and an aperture in said wall, means including a plurality of electrodes for generating oscillations within said cavity resonator, and means for transmitting said oscillations to a load device exterior to said cavity resonator and for transmitting oscillations from an exterior source into said resonator including a plate disposed adjacent the interior surface of said wall of said cavity resonator and opposite said aperture in said wall, means connecting said plate to one of said electrodes, a coaxial transmission line having its outer conductor attached to said wall of said cavity resonator, and means connecting said plate to the inner conductor of said coaxial line through said aperture in said wall of said resonator.

12. Electron discharge apparatus including a cavity resonator and an electrode system including a first electrode adapted to emit electrons, a second electrode adapted to serve as a first pole of said cavity resonator, and a third electrode adapted to emit electrons when bombarded by said electrons emitted from said first electrode and adapted to serve as a second pole of said cavity resonator, the surface of said third electrode having the property of emitting a greater number of electrons than the number of bambarding electrons, a rod connecting said electrode system to a load device including a plate disposed adjacent the interior surface of a wall of said cavity resonator, means connecting said plate to said third electrode, and means for connecting said plate to said load device.

13. Electron discharge apparatus including a cavity resonator, means including a plurality of electrodes for generating oscillations within said cavity resonator, and means for transmitting said oscillations to a load device exterior to said cavity resonator and for transmitting oscillations from an exterior source into said resonator including a plate disposed adjacent the interior surface of a wall of said cavity resonator, a rod connecting said plate to one of said electrodes, and means connecting said plate to said load device.

14. An electron discharge device including an evacuated envelope containing an electrode system including a first electrode comprising a wire adapted to be heated by the passage of an electric current and coated over a portion of its length with electron emissive material, a second electrode comprising a curved wire mesh, and a third electrode having a convex surface adapted to emit electrons when bombarded by electrons emitted from said first electrode, the surface of said third electrode having the property of emitting a greater number of electrons than the number of bombarding electrons, means sealed through said envelope for supporting said first electrode in a plane perpendicular to the axis of said envelope, means sealed through said envelope for supporting said second electrode parallel to said first electrode with its convex surface facing said first electrode, and means sealed through said envelope for supporting said third electrode with its convex surface facing said second electrode.

15. An electron discharge device including an evacuated envelope containing an electrode system including a first electrode comprising a wire adapted to be heated by the passage of an electric current and coated over a portion of its length with electron emissive material, a second electrode comprising a curved wire mesh, a third electrode having a convex surface adapted to emit electrons when bombarded by electrons emitted from said first electrode, and means for supporting said electrodes and said envelope in spaced relationship, said first electrode parallel to the axis of said envelope, said second electrode parallel to said first electrode with its convex surface facing said first electrode, and said third electrode with its convex surface facing said second electrode.

16. In an electron discharge device, a pair of spaced electrodes of limited lateral extent adapted for the passage of electrons between them during operation of the device one of which electrodes is a cathode and the other of which is a secondary emissive dynode, the surface of said dynode having the property of emitting more than one secondary electron for each primary electron that bombards the dynode during operation and electrostatic means for producing a component of velocity in the electrons perpendicular to the direct path between said spaced electrodes so as to minimize the possibility of electrons returning to the space betwen said electrodes said means serving also to intercept said electrons and prevent their return to said space.

17. Electron discharge apparatus including an evacuated envelope, an electrode system within said envelope including a first electrode adapted to emit electrons, a second electrode adapted to attract electrons, and a third electrode adapted to emit electrons when bombarded by the electrons emitted from said first electrode, the surface of said third electrode having the property of emitting a greater number of electrons than the number of bombarding electrons, means including a first conducting member sealed through said envelope for making electrical connection to said second electrode, means including a second conducting member sealed through said envelope for making electrical connection to said third electrode, and an exterior conducting member connected to said second conducting member and extending into proximity with said first conducting member to form a capacitor in conjunction with said first conducting member.

18. Electron discharge apparatus including an evacuated envelope, an electrode system within said envelope including a first electrode adapted to emit electrons, a second electrode adapted to attract electrons, and a third electrode adapted to emit electrons when bombarded by electrons emitted from said first electrode, the surface of the third electrode having the property of emitting a greater number of electrons than the number of bombarding electrons, said second electrode being interposed between said first and third electrodes and being apertured to afford an electron path from said first electrode to said third electrode, means including conducting members sealed through said envelope for making electrical connections to said electrode system from the exterior of said envelope, and an exterior conducting member cooperating with said conducting members and with said second electrode and said third electrode to form a resonant circuit.

19. Electron discharge apparatus including a first electrode adapted to emit electrons, a second electrode to which electrons may be attracted during operation of the device, a third electrode adapted to emit electrons upon bombardment by electrons, the surface of said third electrode having the property of emitting a greater number of electrons than the number of bombarding electrons, said second electrode being interposed between said first and third electrodes and being apertured to afford an electron path from said first electrode to said third electrode, and means including a capacitor for connecting said second electrode and said third electrode to provide a circuit in which oscillations may occur during operation of the device.

20. Electron discharge apparatus including a first electrode adapted to emit electrons, a second electrode to which electrons may be attracted during operation of the device, a third electrode adapted to emit electrons upon bombardment by electrons, the surface of said third electrode having the property of emitting a greater number of electrons than the number of bombarding electrons, said second electrode being interposed between said first and third electrodes and being apertured to afford an electron path from said first electrode to said third electrode, a resonator connected between said second and third electrodes, said resonator including a blocking capacitor for maintaining said electrodes at different direct potentials.

21. Electron discharge apparatus including a first electrode adapted to emit electrons, a second electrode adapted to attract electrons, and a third electrode adapted to emit electrons when bombarded by electrons emitted from said first electrode, the surface of said third electrode having the property of emitting a greater number of electrons than the number of bombarding electrons, a resonator incorporating a blocking capacitor connected between said second electrode and said third electrode, means for connecting a source of direct current between said first electrode and a point in said resonator between said second and third electrodes, an impedance to alternating currents at the resonant frequency of said resonator, and means for connecting said impedance in series with a second source of direct current between said first electrode and said second electrode.

22. Electron discharge apparatus including a first electrode adapted to emit electrons, a second electrode adapted to attract electrons, and a third electrode adapted to emit electrons when bombarded by electrons emitted from said first electrode, the surface of said third electrode having the property of emitting a greater number of electrons than the number of bombarding electrons, a resonator, a capacitor, an impedance to alternating currents at the resonant frequency of said resonator, means for connecting said resonator and said capacitor in series between said second electrode and said third electrode, means for connecting a source of direct current between said first electrode and a point intermediate the ends of said inductor, and means for connecting said impedance in series with a second source of direct current between said first electrode and said third electrode.

23. An electron discharge device including an elongated hermetically sealed envelope, an electrode comprising a wire adapted to be heated by the passage of an electric current and coated over a portion of its length with electron emissive material, means including an apertured transversely extending wafer and a plurality of conducting members sealed through an end of said envelope and supporting said wafer, said wire lying against said wafer in a plane substantially perpendicular to the axis of said envelope, and means including a second electrode for attracting electrons during operation of the device.

24. An electron discharge device including an elongated hermetically sealed envelope containing an electrode system including a filamentary cathode comprising a conducting wire adapted to be heated by the passage of an electric current and coated over a portion of its length with electron emissive material, and means including conducting members sealed through an end of said envelope and a transversely extending insulating wafer carried by said members said wire lying against said wafer in a plane perpendicular to the axis of said envelope.

25. An electrode for an electron discharge device including a wire adapted to be heated by the passage of an electric current and coated over a portion of its length with electron emissive material and means including an insulating wafer for supporting all of the coated portion of said wire in a plane perpendicular to the direction of electron flow and rigid wafer-supporting means joined to said wafer.

26. An electron discharge device adapted for simultaneous operation as a detector and as an oscillator, including a first electrode adapted to emit electrons, a second electrode adapted to attract electrons, and a third electrode adapted to emit electrons when bombarded by electrons, the surface of said third electrode having the property of emitting a greater number of electrons than the number of bombarding electrons, the space between said second electrode and said third electrode being of such a magnitude that, for a specified voltage applied to said second electrode, maximum oscillatory power output and maximum detection sensitivity occur at substantially the same value of voltage applied to said third electrode.

27. An electron-discharge device including a cathode and a further electrode for receiving cathode emission, said cathode being in the form of a filament having an electron emissive portion and having a pair of external terminals to which heating current may be supplied, an insulating member having an aperture and supported by said terminals, said filament extending from said terminals across the aperture and in contact with said insulating member with the emissive portion on one side thereof, a tension spring engaging said filament on the side of said insulating member opposite the emissive portion of the filament, urging the filament firmly against the insulating member, and means supporting said member at a fixed distance from said further electrode.

28. An electron-discharge device including a hermetically sealed envelope containing an electrode system including a filamentary cathode having an electron emissive portion, a wafer of insulating material supported by said envelope and having the emissive portion of said cathode against one of its surfaces and portions of said filamentary cathode extending from the opposite surface thereof, and a spring tensioner engaging one of said extending portions and thereby tensioning said emissive portion against said one surface of said insulating wafer.

29. Electron discharge apparatus including a cavity resonator and means to generate oscillations within said cavity resonator including a first electrode adapted to emit electrons, a second electrode adapted to attract electrons, and a third electrode adapted to emit electrons upon being bombarded by electrons emitted by said first electrode, the surface of said third electrode having the property of emitting a greater number of electrons than the number of bombarding electrons, said second and third electrodes having direct high-frequency connections to said resonator, and said second electrode being interposed betwen said first and third electrodes and being apertured to afford an electron path from said first electrode to said third electrode.

30. Electron discharge apparatus including a cavity resonator, a first electrode adapted to emit electrons, a second electrode adapted to accelerate the electrons emitted by said first electrode and connected as a first pole of said cavity resonator, and a third electrode adapted to emit electrons upon bombardment by electrons emitted from said electrode and connected as a second pole of said cavity resonator, the surface of said third electrode having the property of emitting a greater number of electrons than the number of bombarding electrons, said second electrode being interposed between said first and third electrodes and being apertured to afford an electron path from said first electrode to said third electrode.

31. In an electron discharge device, a cathode, a secondary emissive dynode spaced from said cathode and adapted for passage of electrons from the cathode to the dynode during operation, said dynode having the surface property of emitting a more than one secondary electron for each primary electron that strikes the dynode during operation, said cathode and dynode being of limited lateral extent, and said dynode having a convex surface facing the cathode, a dished grid interposed between said cathode and said dynode having its concave surface facing the convex surface of the dynode and having its convex surface facing the cathode, said cathode, grid and dynode being enclosed in an evacuated envelope and being adapted in operation because of high positive potential applied to the grid and intermediate potential applied to said dynode to have electrons travel from the cathode through the grid to the dynode and to have secondary electrons leave the dynode and penetrate the grid so as to approach the cathode, the sloping surface of the grid and of the dynode serving to direct electrons to leave the dynode along a path at an angle to the direct path from the cathode to the dynode, whereby the electrons leaving the dynode have little tendency to build up a space charge between the grid and the cathode, and electrode means disposed laterally of the cathode-to-dynode space for intercepting and collecting electrons penetrating the grid to reach the cathode side thereof.

32. An electrode for an electron discharge device including an insulating wafer, a conducting wire adapted to be heated by the passage of electric current, and a supporting structure for said wafer extending perpendicularly from the wafer, said wafer having a central aperture, means supporting said wire against one and the same surface of said wire so that it traverses said aperture and lies in a plane, and an electron emissive coating on the portion of said wire traversing said aperture.

33. An electron discharge device including an elongated hermetically sealed envelope containing an electrode system including an electrode adapted to receive electrons, a cathode adapted to emit electrons, said electrode and said cathode being spaced apart in the direction of elongation of the envelope, said cathode being in the form of a wire adapted to be heated by the passage of an electric current and having electron emissive portions, an insulating wafer supporting all of the electron emissive portions of the wire in a plane defined by one surface of the wafer and perpendicular to the direction of elongation of the envelope, and rigid wafer supporting means joined to the wafer and to the envelope.

34. Apparatus including a resonator in combination with an electron discharge device, said device including a cathode, a secondary electron emitter connected to said resonator as one pole thereof, and an accelerator grid between the cathode and the emitter, said accelerator grid being connected to said resonator as a second pole thereof, a high-frequency coupling to said resonator, and a modulation circuit connected to said device externally of said resonator and of the grid-to-emitter interelectrode space.

35. Apparatus according to claim 34, wherein said modulation circuit includes a load for detecting a modulated signal the mean frequency of which differs from the internal frequency of the resonator, wherein the operating voltage applied to said cathode, said grid, and said emitter are optimized to yield a maximum strength of generated signal at said natural frequency while assuring significant asymmetry of the characteristic of said electron discharge device to effect detection.

36. Apparatus according to claim 34 including in addition a modulator connected to said modulation circuit.

37. Apparatus according to claim 34 in which said electron discharge device includes an additional electrode in the vicinity of said cathode, which additional electrode is connected to said modulation circuit, and a source of modulation connected to said circuit.

38. Apparatus as set forth in claim 34, wherein said resonator is a cavity resonator.

39. Electron discharge apparatus including an electrode system and a cavity resonator, said electrode system including a first electrode adapted to emit electrons, a second electrode adapted to attract electrons, and a third electrode adapted to emit electrons when bombarded by the electrons emitted from said first electrode, the surface of said third electrode having the property of emitting a greater number of electrons than the number of bombarding electrons, said cavity resonator including a conducting member and means connecting said conducting member to said third electrode, and means connected to said second electrode for forming a capacitor in cooperation with said conducting member.

40. Electron discharge apparatus including a cavity resonator, an electron discharge device having a grid and a dynode connected to said resonator, the surface of said dynode having the property of emitting more than one secondary electron for each primary electron that bombards said dynode during operation, said electron discharge device also including a cathode, a direct-current and low-frequency blocking bypass construction incorporated in said resonator between said dynode and said grid, a direct-current supply connected to said dynode, said grid, and said cathode, the applied potentials being such as to cause said electron discharge device to operate as a non-linear impedance, and a modulation device between one of the electrodes of said electron discharge device and said direct-current supply.

41. Electron discharge apparatus adapted to act as an oscillation generator and as a detector including a cavity resonator, a first electrode adapted to serve as a first pole of said cavity resonator, a third electrode adapted to emit electrons when bombarded by electrons emitted by said first electrode and adapted to serve as a second pole of said cavity resonator, the surface of said third electrode having the property of emitting a greater number of electrons than the number of bombarding electrons, an impedance, and means for connecting said impedance in series with a source of direct current between said first electrode and said third electrode.

42. An electron tube of the dynatron oscillator type, comprising a thermionic cathode for emitting primary electrons, an anode to be bombarded by said primary electrons and having a surface which acts as a copious source of secondary electrons in response to said bombardment, a grid electrode located between the cathode and anode, a closed cavity resonator having one resonator wall formed in part of said anode and the opposite resonator wall formed in part of said grid, the dimensions of said cavity resonator being proportioned so that the resonance of the cavity determines the dynatron frequency of the tube oscillation while maintaining a negative resistance characteristic between the anode and grid, said cavity resonator being a bi-part metal structure with one part electrically connected to the grid and the other part electrically connected to the anode, and separate connections are provided for the two parts of said resonator to apply different potentials thereto.

43. An electron tube of the dynatron oscillator type, comprising a thermionic cathode for emitting primary electrons, an anode to be bombarded by said primary electrons and having a surface which acts as a copious source of secondary electrons in response to said bombardment, a grid electrode located between the cathode and anode, a closed cavity resonator having one resonator wall formed in part of said anode and the opposite resonator wall formed in part of said grid, the dimensions of said cavity resonator being proportioned so that the resonance of the cavity determines the dynatron frequency of the tube oscillation while maintaining a negative resistance characteristic between the anode and grid, the walls of the cavity resonator being insulated from each other for direct current.

References Cited in the file of this patent

UNITED STATES PATENTS

| Number | Name | Date |
|---|---|---|
| 1,307,510 | Nicolson | June 24, 1919 |
| 1,628,982 | Hulsizer | May 17, 1927 |
| 2,067,966 | Kemperer | Jan. 19, 1937 |
| 2,128,235 | Dallenbach | Aug. 30, 1938 |
| 2,170,219 | Seiler | Aug. 22, 1939 |
| 2,278,210 | Morton | Mar. 31, 1942 |
| 2,287,845 | Varian et al. | June 30, 1942 |
| 2,414,785 | Harrison et al. | Jan 21, 1947 |
| 2,416,303 | Parker | Feb. 25, 1947 |
| 2,417,551 | Hill | Mar. 18, 1947 |
| 2,429,243 | Snow et al. | Oct. 21, 1947 |
| 2,429,811 | Guarrera | Oct. 28, 1947 |
| 2,459,283 | McNall | Jan 18, 1949 |
| 2,517,726 | Skellett | Aug. 8, 1950 |

FOREIGN PATENTS

| Number | Country | Date |
|---|---|---|
| 276,703 | Great Britain | Aug. 29, 1927 |
| 477,787 | Great Britain | Jan 6, 1938 |
| 514,758 | Great Britain | Nov. 16, 1939 |
| 823,119 | France | Oct. 11, 1937 |